(12) United States Patent
Alexander

(10) Patent No.: US 8,412,497 B1
(45) Date of Patent: Apr. 2, 2013

(54) PREDICTING SIMULTANEOUS SWITCHING OUTPUT NOISE OF AN INTEGRATED CIRCUIT

(75) Inventor: Mark A. Alexander, San Francisco, CA (US)

(73) Assignee: Xilinx, Inc., San Jose, CA (US)

(*) Notice: Subject to any disclaimer, the term of this patent is extended or adjusted under 35 U.S.C. 154(b) by 331 days.

(21) Appl. No.: 12/876,967

(22) Filed: Sep. 7, 2010

(51) Int. Cl.
*G06F 17/50* (2006.01)

(52) U.S. Cl. ............ 703/2; 703/14; 716/104; 716/115; 716/136

(58) Field of Classification Search ........... 703/2, 14; 716/104, 115, 136
See application file for complete search history.

(56) References Cited

U.S. PATENT DOCUMENTS

| | | | | |
|---|---|---|---|---|
| 6,429,715 B1 * | 8/2002 | Bapat et al. | | 327/295 |
| 6,499,131 B1 * | 12/2002 | Savithri et al. | | 716/115 |
| 6,675,365 B2 * | 1/2004 | Elzinga | | 716/113 |
| 7,013,452 B2 * | 3/2006 | Baras et al. | | 333/128 |
| 7,132,847 B1 * | 11/2006 | Wong et al. | | 326/29 |
| 7,139,691 B1 * | 11/2006 | Duong | | 703/19 |
| 7,275,193 B1 * | 9/2007 | Verma | | 714/725 |
| 7,298,229 B1 * | 11/2007 | Ruelke | | 333/116 |
| 2004/0188138 A1 * | 9/2004 | Baras et al. | | 174/261 |

OTHER PUBLICATIONS

U.S. Appl. No. 12/190,729, filed Aug. 13, 2008, Alexander, Mark A., Xilinx, Inc., 2100 Logic Drive, San Jose, CA 95124 USA.
U.S. Appl. No, 12/333,151, filed Dec. 11, 2008, Alexander, Mark A., Xilinx, Inc., 2100 Logic Drive, San Jose, CA 95124 USA.

* cited by examiner

*Primary Examiner* — Thai Phan
(74) *Attorney, Agent, or Firm* — W. Eric Webostad

(57) ABSTRACT

Predicting simultaneous switching output noise of an IC device is described. User input is obtained. The user input includes: an identification of an input/output bank of an integrated circuit die; an identification of a device package substrate to which the integrated circuit die is to be attached; and an identification of input/output interface to be used by the input/output bank. A noise factor and an impedance are selected responsive to the user input. The noise factor is multiplied with the impedance to provide a result. The result, which is output, is a prediction of the simultaneous switching output noise of the integrated circuit device.

20 Claims, 10 Drawing Sheets

PREDICTING SIMULTANEOUS SWITCHING OUTPUT NOISE OF AN INTEGRATED CIRCUIT

FIELD OF THE INVENTION

The invention relates to integrated circuit devices ("ICs"). More particularly, the invention relates to predicting simultaneous switching output noise of an IC device.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and the programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As is known, FPGAs, as well as other ICs, may have noise due to transistors switching state. Simultaneous switching output ("SSO") noise in FPGAs depends on many variables, and thus SSO noise has been difficult and complicated to predict. However, complicated models and complex simulations have been able to produce repeatable results that match actual SSO noise measured in corresponding hardware. Yet electrical simulation of such complicated models generally takes days of computer runtime for a single scenario.

Even if simulation is pared down to a few dominant variables, a family of FPGAs may have tens of different packages, and thus hundreds of different I/O banks each with different electrical characteristics. Applications associated with FPGAs may use any of hundreds of different frequencies in any of about a hundred I/O standards. These applications may have any number of contacts in an I/O bank switching at arbitrary times generating SSO noise. Thus, a table holding all possible values of SSO noise would involve a prohibitively large number of storage locations.

Accordingly, it would be desirable and useful to provide means to reduce storage space and computation time to provide reasonably accurate SSO noise predictions.

SUMMARY OF THE INVENTION

One or more embodiments generally relate to predicting simultaneous switching output noise of an integrated circuit device.

An embodiment relates generally to a method for predicting simultaneous switching output noise of an integrated circuit device. In such an embodiment, a computer obtains user input including: an identification of an input/output bank of an integrated circuit die; an identification of a device package substrate to which the integrated circuit die is to be attached; and an identification of input/output interface to be used by the input/output bank. A noise factor and an impedance are selected responsive to the user input. The noise factor is multiplied with the impedance to provide a result. The result is output as a prediction of the simultaneous switching output noise of the integrated circuit device.

Another embodiment relates generally to another method for predicting simultaneous switching output noise of an integrated circuit device. In such an embodiment, impedance profiles are computed as a function of frequency responsive to simulated stimulus provided to a system model. The impedance profiles are for input/output banks of integrated circuit devices, including the integrated circuit device. At least one excursion profile is generated through measurement for at least one reference input/output bank of at least one reference die for at least one device package substrates type. A resonant frequency is identified from the at least one excursion profile. At least one base noise curve at the resonant frequency is generated for at least one input/output interface using multiple quantities of aggressors. The at least one base noise curve is divided with impedance from an impedance profile of the impedance profiles for the at least one input/output reference bank for the at least one device package substrate type to provide noise factors. The noise factors are stored according to the at least one input/output interface and the numbers of aggressors in a database. The impedance profiles are stored in the database. A value for the predicted simultaneous switching output noise of the integrated circuit device is output by a prediction engine.

Another embodiment relates generally to a non-transitory machine-readable medium having stored thereon information that, when executed by a general-purpose processor, causes performance of a method for predicting simultaneous switching output noise of an integrated circuit device. In such an embodiment, user input is obtained including: an identification of an input/output bank of an integrated circuit die; an identification of a device package substrate to which the integrated circuit die is to be coupled; an identification of input/output interface to be used by the input/output banks, and a quantity of aggressors. A noise factor and an impedance are selected responsive to the user input. The noise factor is multiplied with the impedance to provide a result. The result is output as a prediction of the simultaneous switching output noise of the integrated circuit device.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
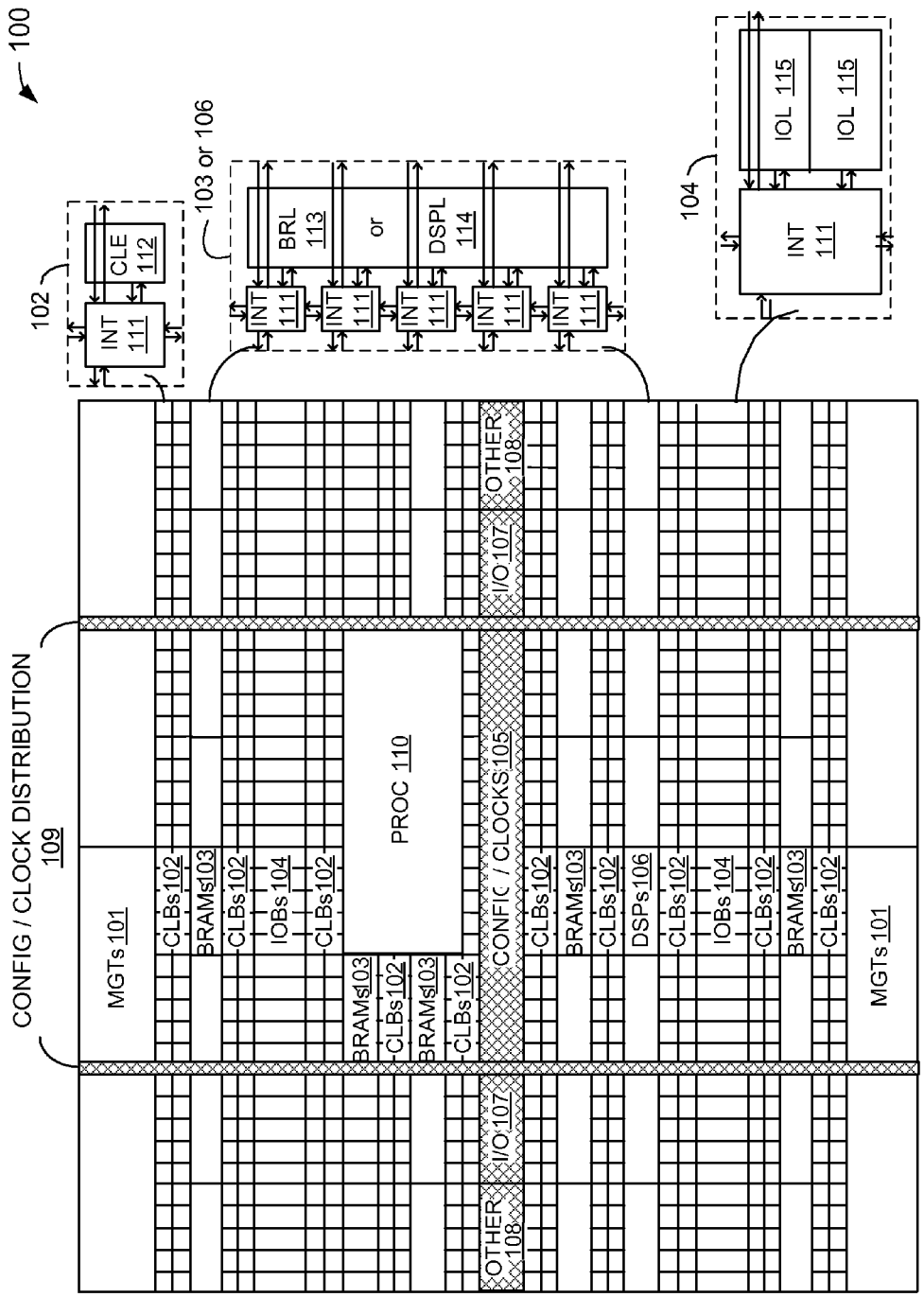
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

FIG. 1 is intended to illustrate only an exemplary FPGA architecture. For example, the numbers of logic blocks in a horizontal column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
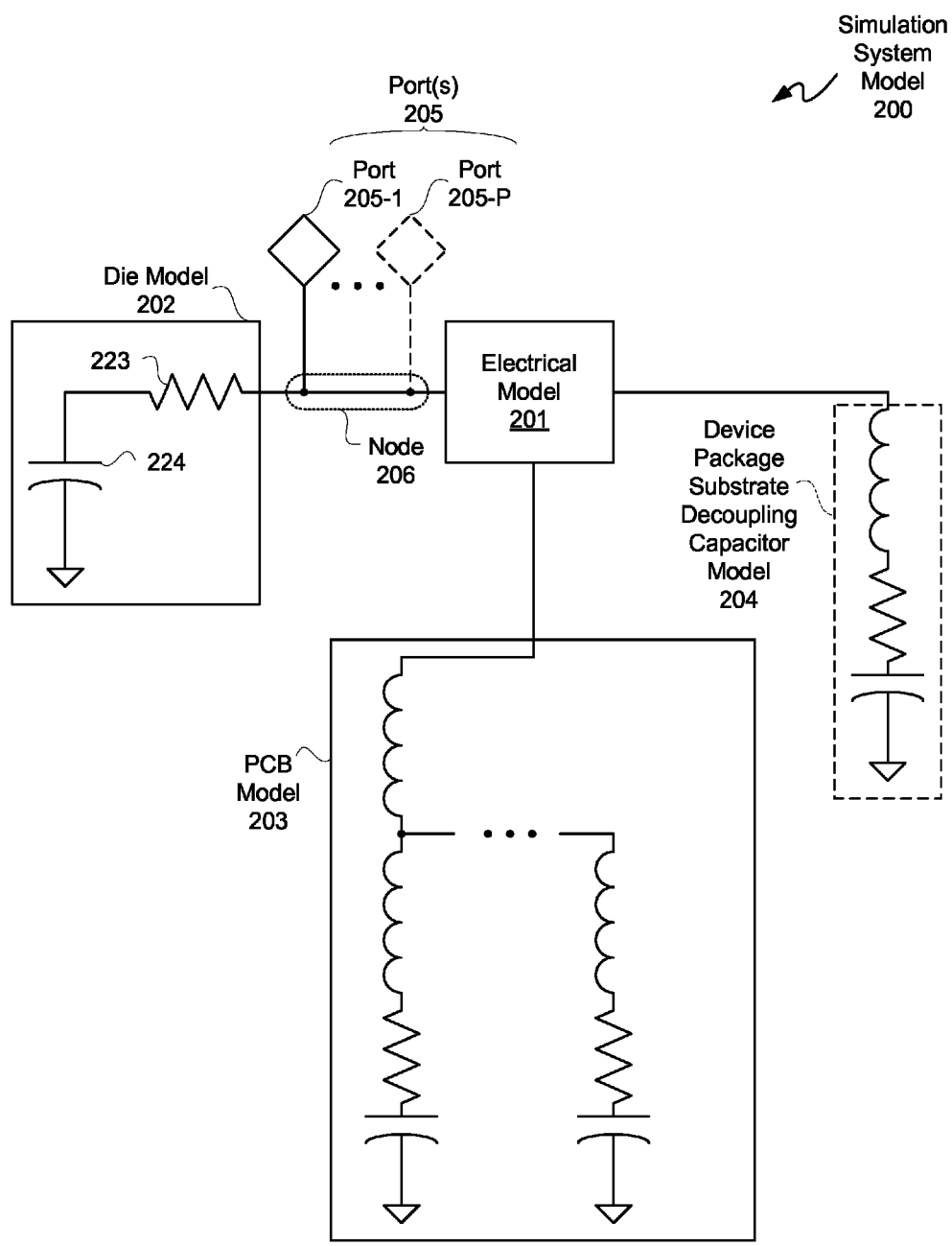
FIG. 2 is a block/circuit diagram depicting an exemplary embodiment of a simulation system model.

FIG. 2 is a block/circuit diagram depicting an exemplary embodiment of a simulation system model 200. Simulation system model 200 includes an electrical model 201, semiconductor integrated circuit die ("die") model 202, and printed circuit board ("PCB") model 203. Simulation of s-parameter model 201 is for a reference I/O bank ("reference bank") of a device package substrate. In this exemplary embodiment, an s-parameter model is used for electrical model 201; however, other types of electrical models may be used, such as an RLC model for example. For purposes of clarity by way of example and not limitation, an s-parameter model 201 is described, as it shall be understood from such description that other types of electrical models may be used. Optionally, a substrate decoupling capacitor may be coupled to a device package substrate having a die mounted thereon, and thus optionally a substrate decoupling capacitor model 204 may be used to model such decoupling capacitor. As is known, a die is conventionally mounted to a device package substrate before encapsulation, if encapsulation is used. Examples of a device package substrate include a lead frame, an organic substrate, a ceramic substrate, a "build-up" substrate, and a "silicon" substrate or "carrier".

In this exemplary embodiment, s-parameter model 201 is a three port ("S3P") model; however, s-parameter models with other numbers of ports may be used. As is known, an s- or scattering-parameter model is generally a description in terms of frequency of behavior of a network of circuitry. As described below in additional detail, s-parameter model 201 may be associated with at least one bank of I/O contacts forming an external interface portion of a die associated with die model 202. More particularly, s-parameter model 201 may be associated with a power subsystem of at least one bank of contacts, where such power subsystem is of a die. Accordingly, the network of circuitry modeled by s-parameter model 201 may be such power subsystem. S-parameter model 201 may be in any of a variety of known formats. For this exemplary embodiment, it is assumed that a Touchstone format, which may list frequencies and associated magnitudes and phases, is used; however, it should be appreciated that other formats, such as a frequency dependent RLC model, for example, may be used.

Die model 202 may include parasitic resistance 223 and die capacitance 224. Die model 202 is for modeling capacitance and resistance associated with a die.

Simulation system model 200 includes s-ports 205-1 through 205-P (collectively "s-ports 205"), for P a positive integer greater than one in this example, even though as few as one s-port 205-1 may be used. For purposes of clarity by way of example and not limitation, it shall be assumed that more than one s-port is used in this example implementation. Node 206, coupled to s-ports 205, may be used to function as both an input node and an output node. Thus, stimulus may be provided to simulation system model 200 via node 206. It should be appreciated that simulation system model 200 may be stimulated with a variety of frequencies of interest.

Furthermore, node 206 may be used to obtain output responsive to such signaling stimulus. Output obtained at node 206 includes impedance parameters ("z-parameters"). Such z-parameters may be a function of the signal frequency input and thus responsive to the stimulus provided. For an s-parameter model associated with an I/O bank of a device package substrate, z-parameters obtained would be associated with such I/O bank of such device package substrate.

Input is provided to one or more s-ports of simulation system model 200. An I/O bank power network is modeled by models 201 through 204 in order to obtain one or more z-parameters. An I/O bank power network may include power and ground for a bank, a portion of a die corresponding to such bank, a portion of a device package substrate corresponding to such bank, optionally a portion of a PCB and its associated discrete capacitors corresponding to such bank, and optionally a decoupling capacitor coupled to such bank. Such a decoupling capacitor may be a discrete package substrate decoupling capacitor.

Simultaneously switching output ("SSO") noise is a function of frequency of operation of an integrated circuit with such an I/O bank. The trend of such SSO noise as a function of frequency may follow the trend of power system impedance as a function of frequency. This SSO noise is predicted by simulation prior to manufacture of such integrated circuit, as described herein. By stimulating simulation system model 200, z-parameters to identify network impedance as a function of frequency may be obtained.

Figure 3:
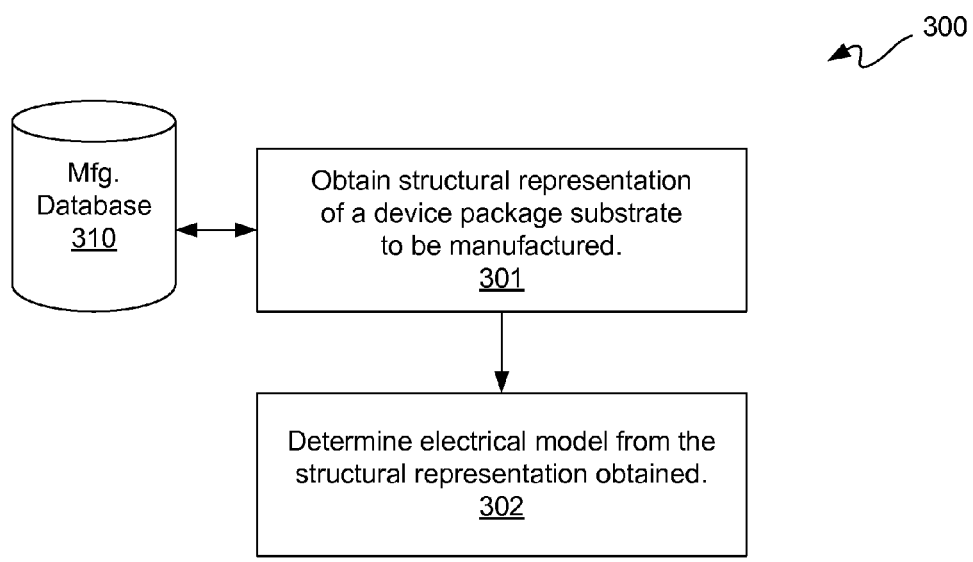
FIG. 3 is a flow diagram depicting an exemplary embodiment of an s-parameter model extraction flow.

Referring to FIG. 3, there is shown a flow diagram depicting an exemplary embodiment of an s-parameter model extraction flow 300. At 301 of s-parameter model extraction flow 300, a structural representation of a device package substrate is obtained. It should be appreciated that determining SSO noise directly by testing each device package substrate may be cumbersome. Furthermore, it should be understood that SSO noise may vary greatly among device package substrates depending upon the application. Because FPGAs may be used with a variety of different operating parameters, it is not commercially reasonable to assemble each FPGA and test it in every possible application a user may think of in order to ascertain a worst case SSO. However, even though through the use of accurate simulations, determination of SSO noise as described herein may be performed prior to any manufacture of a die and an associated device package substrate to which such die is to be mounted, it shall be assumed for reasons of practicality that at least one operable die and at least one operable device package substrate for such die have been manufactured for purposes of obtaining measured data therefrom.

The structural representation of a device package substrate obtained at 301 may be stored in a manufacturing database 310. An "mcm" type of file may be used for such structural representation; however, other known types of manufacturing database files may be used. Once a manufacturing database file or files for a device package substrate are obtained, the structural representation of structures of such device package substrate may be used. Because such manufacturing information effectively includes three dimensional representations of such device package structures, as well as the materials to be used in the formation of such device package structures, an electrical model of such package structures may be obtained or extracted through the use of a "field solver" or other such computational method for use of such electrical model in simulation.

Once a structural representation of a device package substrate is obtained at 301, an s-parameter model may be determined from such structural representation at 302. Such s-parameter model may take into account physical properties associated with materials used in such device package substrate. Even though a single s-parameter model for a single I/O bank is described herein, it should be appreciated that multiple s-parameter models may be determined for multiple banks of I/O of a device package substrate.

It should be understood that within a product family of ICs, some devices may have device package substrates with one or more decoupling capacitors and some may not. Furthermore, within a product family of ICs, device package substrate decoupling capacitors may be different for different die. Moreover, within a product family of ICs, one or more semiconductor die or chips ("die") may have associated therewith different device package substrate sizes. Some die may have more I/O contacts than others and use a larger device package substrate, and die with more I/O contacts may have more layers within their device package substrate.

Figure 11:
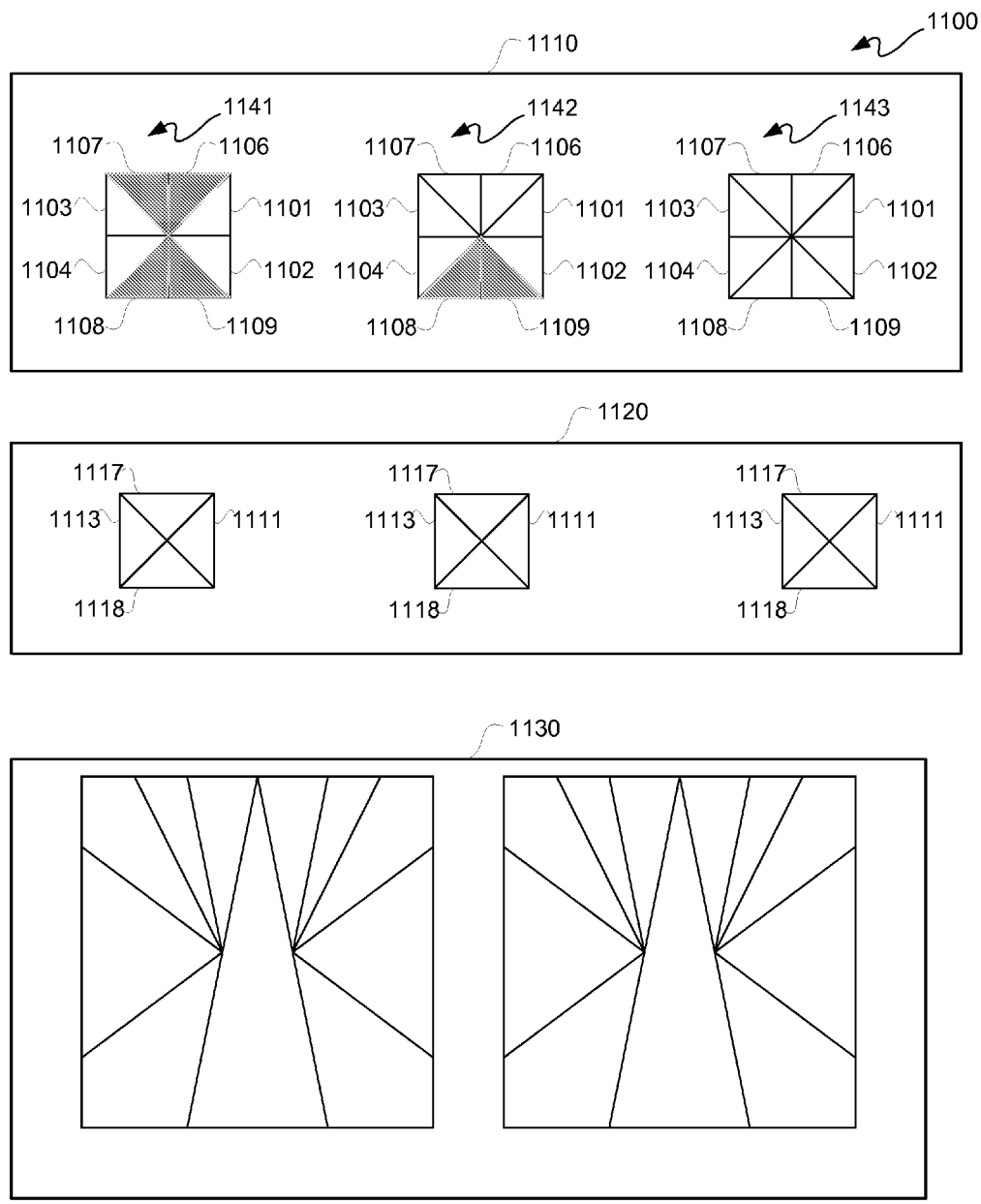
FIG. 11 is a block diagram depicting an exemplary embodiment of various types of FPGAs of an FPGA family.

FIG. 11 is a block diagram depicting an exemplary embodiment of various types of FPGAs of an FPGA family 1100. Even though the example of an FPGA family is used, it should be understood that any type of integrated circuit device family may be used.

Within FPGA family 1100, there are three sets of package types, namely package types 1110, 1120, and 1130. In package type 1110, there are die 1141, 1142, and 1143. In this exemplary embodiment, die 1141, 1142, and 1143 may all have the same die size, or may all have different die sizes, or a combination thereof; however, the I/O configurations of die 1141, 1142, and 1143 are different from one another. For example, die 1141 has I/O banks 1106 through 1109 as "no connects." For die 1142, I/O banks 1108 and 1109 are no connects. Lastly, for die 1143, all possible I/O banks, namely I/O banks 1101 through 1104 and 1106 through 1109, are operative.

Any operative I/O bank of any of die 1141 through 1143, or more generally within a same package type, may be used as a reference bank for purposes of measurement, as described below in additional detail. Thus, for example, bank 1103 of die 1142 may be a reference bank for any and all operative of banks 1101 through 1104 and 1106 through 1109 of die 1141 through 1143.

It should be understood that a die 1142 may have banks 1106 through 1109 as no connects, as does die 1141, but die 1142 may also have more internal resources. Furthermore, excluding I/O resources, die 1143 may have the same amount of internal resources as die 1142. Thus, it should be understood that die within a same package type, such as package type 1110, may be different sizes to accommodate different amounts of resources, even though die of package type 1110 in this exemplary embodiment are all the same size. Package type 1120 includes three separate dies with each die having I/O banks 1111, 1113, 1117, and 1118 that are all operative. In addition, package type 1130 includes two separate dies with each die having I/O banks represented by the triangles and quadrilaterals where all of the I/O banks are operative.

Device package substrates for connecting to die of a package type may vary within such package type. The physical die interface, such as flip-chip bumps, from a die to a die package interface of a device package substrate may be different for each of die 1141 through 1143 to accommodate different operative sets of I/O banks. However, the PCB physical interface, such as a ball grid array ("BGA") interface, of such device package substrates may be the same even though the die package interfaces may vary within a device package substrate type. Furthermore, the number of layers of such device package substrates within a same device package substrate type is the same.

Measured voltage noise for a sweep of frequency or various discrete frequency points ("sweep") may vary substantially with respect to different device package substrates. Additionally, the presence or absence of one or more device package substrate decoupling capacitors has an effect on such measured voltage noise, and the I/O standard protocol employed has an effect on such measured voltage noise. Because of the variance introduced by differences in a product family of ICs as associated with different device package substrate configurations, a local reference may be established for extrapolations.

Measurements of a reference die attached to a reference device package substrate ("reference device") may be used to obtain reference values for extrapolations to a die and a device package substrate of the same type as the reference device. Furthermore, a reference die bank may be used for extrapolations to other banks of the reference die or other die of the same package type.

A family of die, such as FPGA family 1100 of FIG. 11 for example, may have a die of a package type in such family used as a reference die for that type. Extrapolations may be from a bank of such a reference die to unmeasured banks of such reference die. Furthermore, extrapolations based on the reference bank of the reference die may be made to unmeasured banks of other die packages which are the same package type as the reference die for such device package substrate type. In other words, such die within a package type should all have at least substantially the same die characteristics with respect to SSO noise generation.

Within a die package type, there may be a die with all I/O populated; there may be a die with the same number of I/O as another die, but with more internal resources; there may be a die with a subset of all possible I/O, as not all I/O may be connected; or there may be some combination of two or more of these. For example, a small die within a die package type may not bring out all the I/O banks as a large die of the same die package type, as such I/O may not be available in the small die of such die package type. Thus, a reference die for a die package type may have more or less resources than another die in the same die package type. With respect to FPGAs for example, the number of I/O bank contacts of a reference die may be the same, less than, or greater than other die of the same die package type. For example, for FPGAs, one die may have a same configuration of I/O banks as another die within the same package type, but one of such die may be larger due to having more internal resources.

A device package substrate of a type may be defined according to number of layers of the device package substrate and PCB contact "sizing" or contract type. PCB contact sizing may include PCB contact array size, such as BGA dimensions (e.g., number of balls in x and y directions), and contact pitch. Contact type may include BGA solder balls, PGA pins, LGA lands, CGA columns, QFP pins, DIP pins, or other. Device package substrates of a type may thus all have the same number of layers and the same BGA array both as to dimension and pitch and the same contact type.

Figure 12:
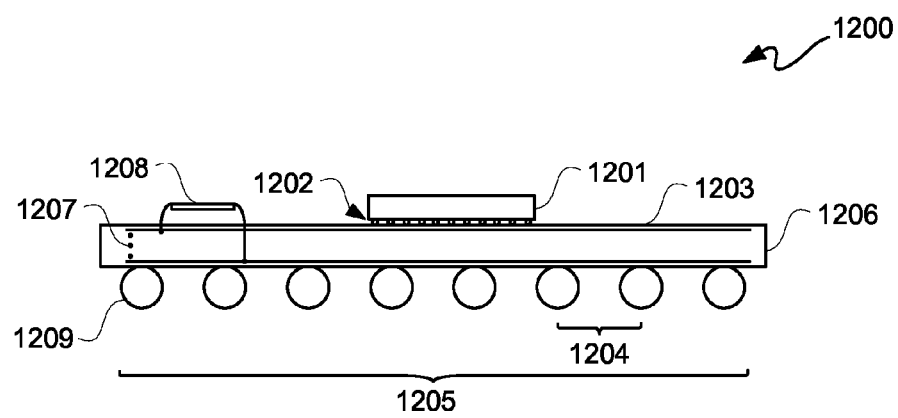
FIG. 12 is a block diagram depicting an exemplary embodiment of a packaged IC.

FIG. 12 is a block diagram depicting an exemplary embodiment of an IC package 1200. IC package includes die 1201 and device package substrate 1206. Device package substrate 1206 may include one or more conductive layers 1207. Optionally, a decoupling capacitor 1208 may be coupled to layers 1207.

Die 1201 is connected to conductive elements of device package substrate 1206 by die package physical interface contacts 1202, such as flip-chip bumps for example. Alternatively or additionally, die 1201 may be coupled with wire bonds. BGA 1205 has balls 1209 spaced apart with a pitch of 1204. Balls 1209 are connected to conductive elements of device package substrate 1206 for electrical continuity with contacts 1202.

Figure 4:
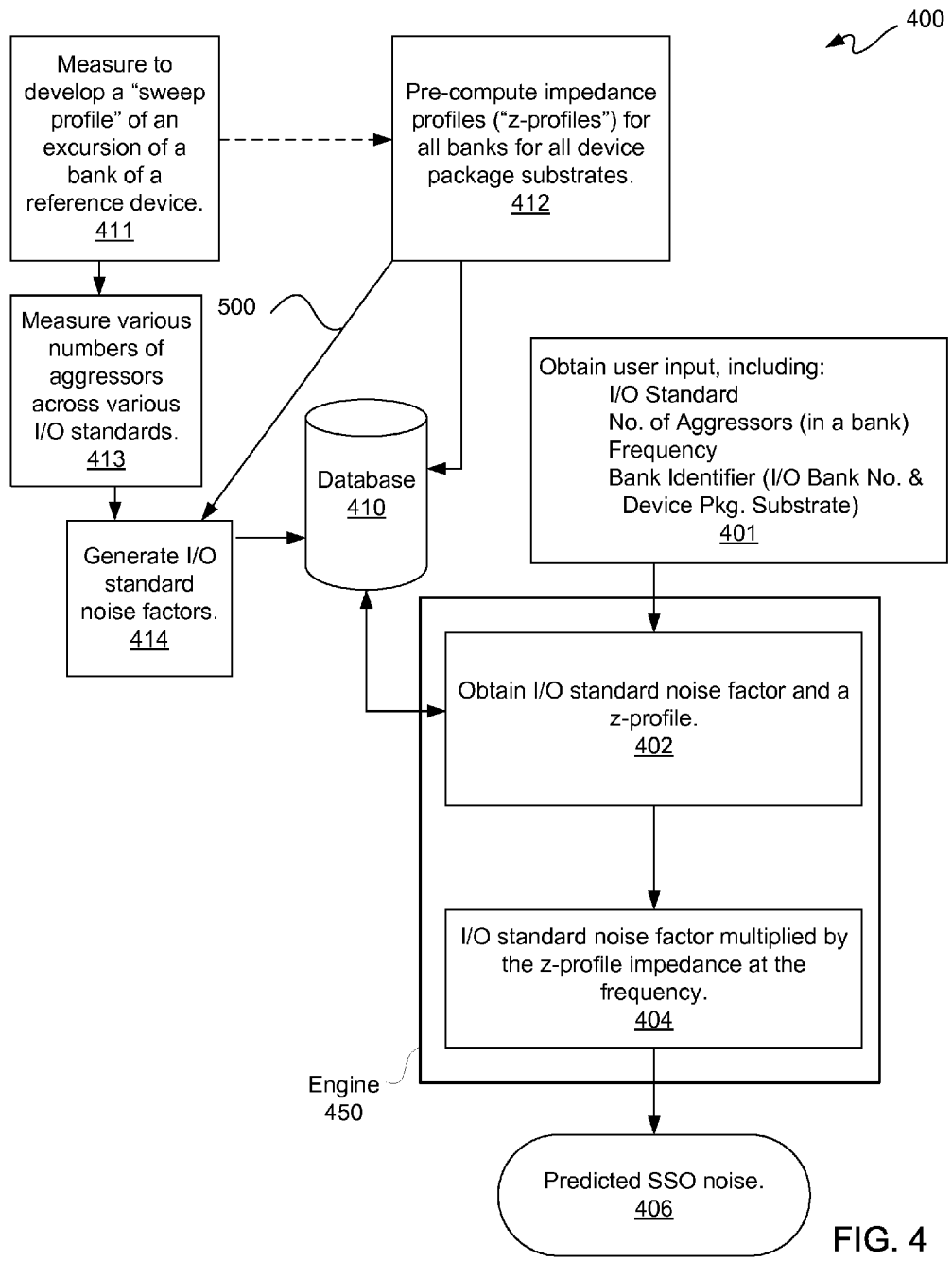
FIG. 4 is a flow diagram depicting an exemplary embodiment of an SSO noise prediction flow.

FIG. 4 is a flow diagram depicting an exemplary embodiment of an SSO noise prediction flow 400. At 401, user input is obtained. User input may include information about an integrated circuit device, such as what die is to be used and what device package substrate such die is to be coupled to. Even though the example of an FPGA is used, it should be understood that any type of integrated circuit device may be used. User input may further include an I/O interface standard or protocol, a number of aggressors (if less than all possible aggressors for a bank are selected), a frequency (if not specified or otherwise determinable from the I/O interface standard or protocol), and a bank identifier, such as used in an FPGA application. Accordingly, it should be understood that by identifying a bank of a die, a device package substrate, if more than one is available for such die, and an I/O interface, other parameters may be inferred or selected by default.

The terms "I/O standard" and "I/O interface standard" as used herein are meant to include any or all I/O interface standards and protocols that may affect SSO noise generation, as described herein. Furthermore, an I/O standard may include one or more I/O protocols, and vice versa. There are many known types of I/O standards that may be used. Single-ended I/O standards include LVCMOS, LVTTL, HSTL, SSTL, GTL, and PCI. Differential I/O standards, such as those using two IOBs grouped together as a single tile with respect to an FPGA, include LVDS, HT, LVPECL, BLVDS, differential HSTL, and differential SSTL. The listing of single-ended and differential I/O standards is not intended to be exhaustive, but is merely to illustrate some of those I/O standards that may be used. Furthermore, it should be appreciated that non-standardized I/O interfaces may be used.

A number of aggressors is input at 401. The number of aggressors may vary from bank to bank, depending upon bank configuration and application. For example, suppose an I/O bank has 40 contacts, some of which are associated with another chip, such as for example a memory chip having 32 data contacts. Suppose in an operation, 20 of the 32 data contacts change state from one cycle to the next, thus for that operation there would be 20 aggressors. Again, it should be appreciated that an aggressor is an I/O that is actively switching in a bank. Thus even though there are 32 contacts operatively coupled to such a memory device, it is not a given that there are or ever will be 32 aggressors for each or any operation associated with such memory device.

It should be appreciated that not all contacts in an I/O bank are I/O contacts; other contacts in an I/O bank may include power and ground contacts. An I/O bank number as well as a device package substrate type may be related by a bank identifier. Thus, a bank identifier may be used in part to indicate the maximum possible number of aggressors or I/Os in an I/O bank. It should be appreciated that power and ground contacts do not actively switch during normal operation, and thus are not considered part of the number of aggressors.

Multiple banks may have the same or different maximum numbers of aggressors, namely the same or different numbers of I/Os. An aggressor is an I/O, such as an IOB for example, having one or more transistors that are switching and thereby causing transient current to be received by the power system associated with such one or more switching transistors. It should be appreciated that the impedance of such power system converts such transient current into a noise voltage. Thus a power system associated with an I/O bank, which may be a subsystem of an overall power system of a die, may be thought of as a transducer that converts transient current into noise. A relevant parameter of such power system for such conversion is the impedance of such power system. As previously described, impedance can be a function of frequency.

The frequency of operation of such I/Os, namely the frequency at which transistors are switching, is another input at 401. It is possible that all or a subset of I/Os of a bank simultaneously switch during an application, and thus for purposes of predicting SSO noise generation such prediction may span a range of simultaneous switching I/Os of a bank. Furthermore, it should be appreciated that the type of I/O standard used may be a factor in the generation of transient current associated with such SSO noise. In short, for an application, transient current of an I/O interface could be affected by the number of output buffers simultaneously switching. However, it should be understood that the transient current could remain constant while frequency changes, and this, through the frequency dependent transfer function of the power system impedance, may give rise to variance in the simultaneous switching noise.

A bank identifier input at 401 indicates an I/O bank to be used for SSO noise prediction, as there may be multiple I/O banks of an integrated circuit die. A device package type input at 401 indicates the device package substrate type to be used for SSO noise prediction, as there may be multiple device package substrate types.

At 402, an I/O standard noise factor and a z-profile are obtained from database 410 responsive to an I/O standard and bank identifier obtained at 401. Frequency response of each I/O bank may be different from one another, and this difference may be frequency dependent. The entire z-profile need not be obtained, but rather a portion or portions of the z-profile for one or more frequencies of interest may be obtained.

In order to populate database 410, operations 411 through 414 may be performed. At 411, voltage measurements on an operative reference bank of a reference die attached to a device package substrate are taken over a range of frequencies. For each type of device package substrate associated with such a reference die, voltage measurements at 411 are performed. One reference die may be selected for each die package type, and an operative bank of such reference die may be selected as a reference bank. Thus, only one bank of one die may be selected for all banks of all die within a package type. However, there may be more than one device package substrate type that can be used with a die package type.

Voltage measurements at 411 may be performed for all device package substrate types to which such reference die may respectively be attached. A resonant frequency identified from a reference bank of a reference die for a device package substrate type may be used for all banks of all die in the associated device package substrate type.

At 412, impedance profiles or z-profiles may be pre-computed by simulation for all banks of all device package substrates, including the banks of the reference device used in 411. For example, all banks of all die of a die family may have z-profiles for all device package substrates associated therewith. Such simulation may be performed as described above with reference to FIG. 2. It should be understood that variations in z-profiles determined at 412 are to account for differences caused by different device package substrates, as well as differences among banks. Thus, all device package substrates of interest for every bank of a group of die may have associated therewith pre-computed z-profiles.

Suppose for example, that there are 8-layer, 6-layer, and 4-layer device package substrates for coupling to an FPGA die having a package type of a maximum of 20 operational banks. Further suppose that for these 3 types of device package substrates there are 12 different BGA sizes for each type. A z-profile for this example may be pre-computed for all 20 banks of all 36 types (e.g., 3 types by layer multiplied by 12 types by BGA configuration) of device package substrates at 412.

At 413, changes in voltage may be measured for various numbers of aggressors of each I/O standard at resonant frequency for the reference bank of each reference die. Furthermore, these measurements may be performed for each device package substrate type to which the reference die is capable of being attached.

It should be understood that even though the terms "measurement" or "measurements" are used, such operation need not be performed manually. Rather, a measuring operation may be automated, such as at 411 and 413. For example, a script may be used to automatically carry out measurements as described herein. It should be understood that measurements are performed at a fixed frequency. This fixed frequency may be a resonant frequency obtained at 411, as described below in additional detail.

Figure 5A:
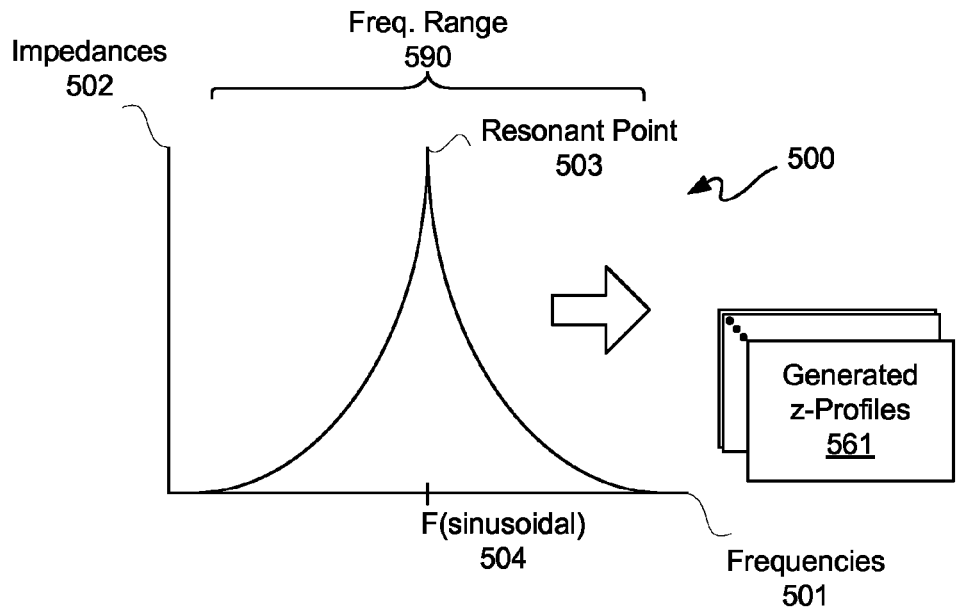
FIG. 5A is a block/graph diagram depicting an exemplary embodiment of a z-profile.

FIG. 5A is a block/graph diagram depicting an exemplary embodiment of a simulation for producing a z-profile 500. Z-profile 500 is obtained from simulation as previously described with reference to FIG. 2. Z-profile 500 results from a simulation over frequency range 590 of frequencies 501 to obtain impedances. More particularly, a resonance point 503 and an associated resonance frequency 504 may be identified from simulation at 412 of FIG. 4. All banks of all device package substrates of interest may have z-profiles generated by simulation for them at 412. Z-profiles 561, including z-profile 500, are provided to database 410 of FIG. 4 for storing therein.

Figure 5B:
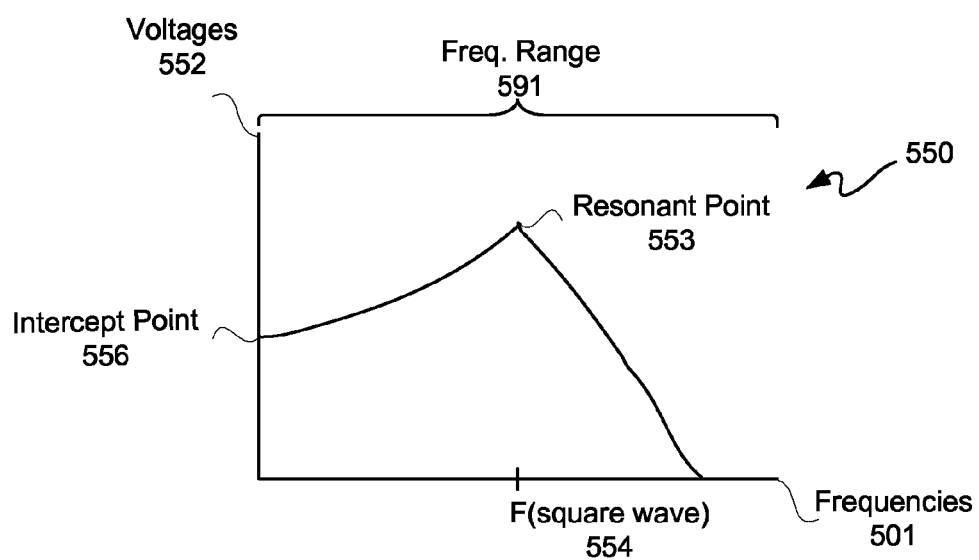
FIG. 5B is a graph diagram depicting an exemplary embodiment of an excursion profile.

In FIG. 5B, frequencies, such as of frequencies 501, are provided at 411 of FIG. 4 to signal output drivers of a reference bank of a reference device to obtain measured voltage values, such as of voltages 552. This is to obtain an "excursion frequency sweep profile" or "excursion profile" 550 for a measurement frequency range 591.

A difference in generating a simulated profile 500 and a measured profile 550 is that in simulation, the stimulus is a sinusoidal wave, while in measurement, the stimulus is a square or a trapezoidal wave. Thus, it should be appreciated that the stimulus provided to node 206 of FIG. 2 for simulation is sinusoidal. Rise and fall times of the square/trapezoidal waves determine harmonic content and are a function of an I/O standard. A reference I/O standard may be selected, or measurements may be conducted for multiple I/O standards. There may be a peak in impedance profile, namely at a resonant point 503 at a resonant frequency ("F") 504.

Excursion profile 550 is a measured response based on an I/O bank of a reference device. For measuring an operating device, the signal stimulating the steady-state noise is generally a square or trapezoidal wave with frequency content at and above a fundamental frequency, and this may be thought of as a data rate or a switching frequency. The reference frequency, such as resonant frequency 554, in excursion profile 550 is close but not necessarily equal to the reference frequency in z-profile 500, namely resonant frequency 504. Measurements used in generating excursion profile 550 may be used to identify a peak frequency 554. Accordingly, a maximum excursion in voltage may be at peak frequency 554, which is assumed to be the resonant frequency.

Response for every possible frequency in each range 590 and 591 need not be selected in order to generate responses or profiles 500 and 550. However, accuracy of a measured and/or simulated response may be enhanced by selecting more frequency points. Thus, at 411 of FIG. 4, measurement is used to generate excursion profile 550, and, at 412 of FIG. 4, simulation is used to generate z-profile 500.

Figure 6:
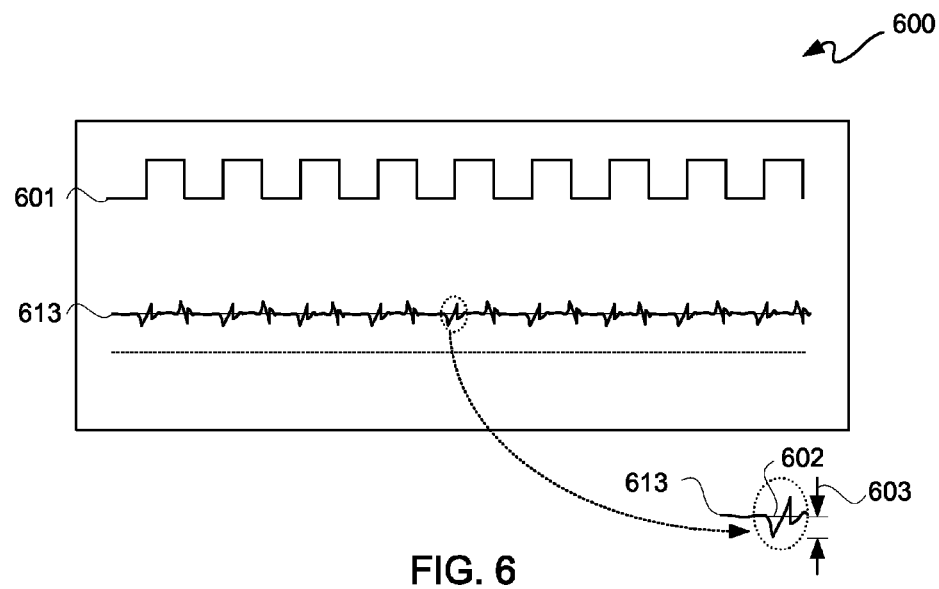
FIG. 6 is a signal diagram depicting an exemplary embodiment of aggressor noise influence.

With reference to FIG. 6, there is shown a signal diagram depicting an exemplary embodiment of aggressor noise influence 600. An aggressor signal 601 is illustratively shown as transitioning. A non-switching signal 613 is held at a constant logic high, such as a logic 1 value. However, transitioning by aggressor signal 601 generates noise which perturbs non-switching signal 613. The maximum excursion below a logic high voltage level 602 of non-switching signal 613, namely excursion 603, is a base noise value for one frequency of aggressor signal 601.

Base noise may be defined as the magnitude of excursion below a steady state logic 1 value in volts. This base noise value may be established at a reference frequency in a reference I/O bank in a reference die for which excursion profile 550 of FIG. 5B is obtained. In a measurement for base noise, the reference die, the reference I/O bank, and the reference frequency may be held generally constant. The reference frequency may be the frequency at which the maximum excursion below a steady state logic 1 value occurs for the reference I/O bank. In other words, the reference frequency may be the frequency at which the base noise value is greatest.

It should be appreciated that frequency of aggressor signal 601 may result in a maximum excursion 603 below a steady state logic 1. A maximum excursion may be when the reference frequency is resonant frequency 554 of FIG. 5B and all I/Os in the reference I/O bank are simultaneously switching. The maximum excursion below a logic high voltage, as illustratively shown in FIG. 6 as excursion 603, is generally for all I/Os of a bank simultaneously switching while operating at the resonant frequency.

Measurements used to produce excursion profile 550 of FIG. 5B may be for a selected I/O standard, namely a reference I/O standard, and may have a different effect for a different number of aggressors. Thus, excursion profile 550 may be for a reference I/O standard at a reference number of aggressors. Alternatively, excursion profiles may be generated for various I/O standards or for various numbers of aggressors.

Figure 7:
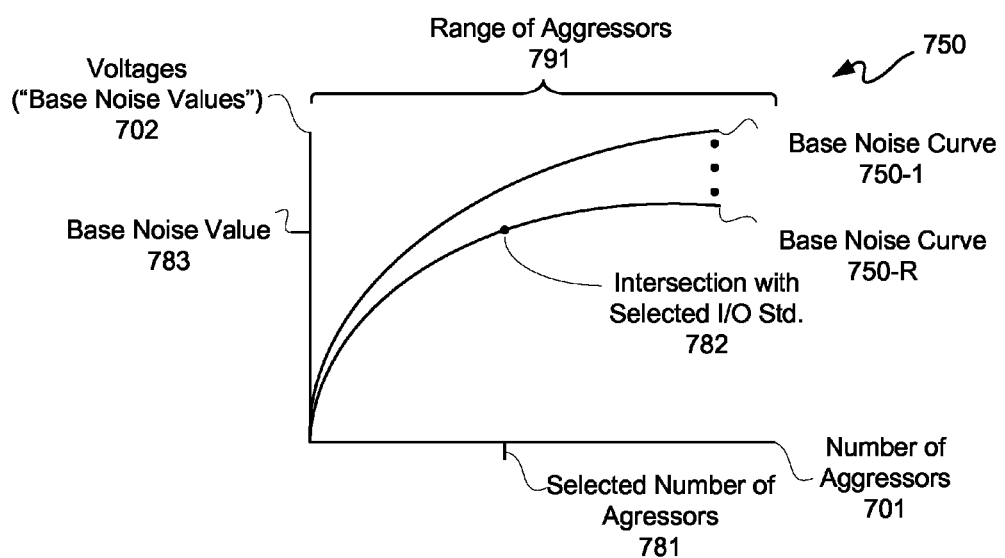
FIG. 7 is a graph diagram depicting an exemplary embodiment of base noise curves.

With reference to FIG. 7, there is shown a graph diagram depicting an exemplary embodiment of base noise curves 750-1 through 750-R (collectively "base noise curves 750") for R a positive integer greater than two. Each base noise curve 750 may be thought of as being in a range of aggressors 791. Excursion profile 550 of FIG. 5B is used to determine a reference frequency, namely resonant frequency 554. Base noise values 702 are generated for an I/O standard at resonant frequency 554.

With simultaneous reference to FIGS. 4, 5, and 7, at 413, base noise values for various numbers of aggressors for a reference bank used at 411 may be measured. At 413 multiple base noise curves are generated for multiple reference die. These measurements are made using a stimulating signal at resonant frequency 554 obtained from excursion profile 550 for each such reference die bank. Moreover, a set of reference curves is determined by measurement at 413 for each reference bank of each die package type for each associated device package substrate type for each I/O standard available in such bank.

For such measurement, resonance frequency 554 is generally held constant and excursion values, as associated with voltages 702, are obtained for various numbers of aggressors 701 for a selected I/O standard. Accordingly, voltage responses for base noise curve 750-1 are for one I/O standard, and voltage responses for base noise curve 750-R are for a different I/O standard than the one used to generate base noise curve 750-1. Thus, for each reference bank and associated device package substrate type or types, a set or sets of base noise curves may be generated for a plurality of I/O standards all operating at a resonance frequency 554 associated therewith. Thus, sets of values for base noise curves may be established across two variables, namely an I/O standard and a number of aggressors.

While accuracy may be enhanced by generating base noise curves 750 for each possible aggressor quantity, it should be appreciated that interpolation between selected quantities of aggressors may be used in order to obtain some voltages 702 on curves 750. Base noise curves 750 have a greater degree of difference in base noise voltage values for lower numbers of aggressors than for high numbers of aggressors. In other words, as the number of aggressors increases, the slope of a curve of an I/O standard base noise curve tends to become more linear in a direction of increasing numbers of aggressors. Accordingly, interpolation between higher numbers of aggressors 701 as opposed to lower numbers of aggressors 701 may yield more accurate results than interpolation between lower numbers of aggressors 701.

Measurements for all lower numbers of aggressors may be obtained, and only a few high numbers of aggressors may be obtained by measurement, where the remainder of such high numbers of aggressors is determined by interpolation. Thus, base noise curves 750 may be generated for a plurality of bank packing densities, such as for FPGAs.

With continuing reference to FIGS. 4 and 5, a reference z-profile 500 is provided from 412 for generation of I/O standard noise factors at 414. At 414, voltages from a reference set of one or more base noise curves generated at 413 are divided by the impedance at a resonant frequency 504 obtained from a z-profile 500. The result of such divisions is a set of I/O standard noise factors. Recall, that a z-profile for each bank of all device package substrates of interest are pre-computed at 412. Each such z-profile has an impedance at an associated resonant frequency 504. Reference base noise curves are divided by reference impedance data to generate respective noise factors, so z-profiles for all other devices, namely non-reference device package substrates, may be respectively multiplied by associated noise factors to generate predictions. I/O standard noise factors generated at 414 may be stored in database 410 along with z-profiles pre-computed at 412.

Figures 8, 9:
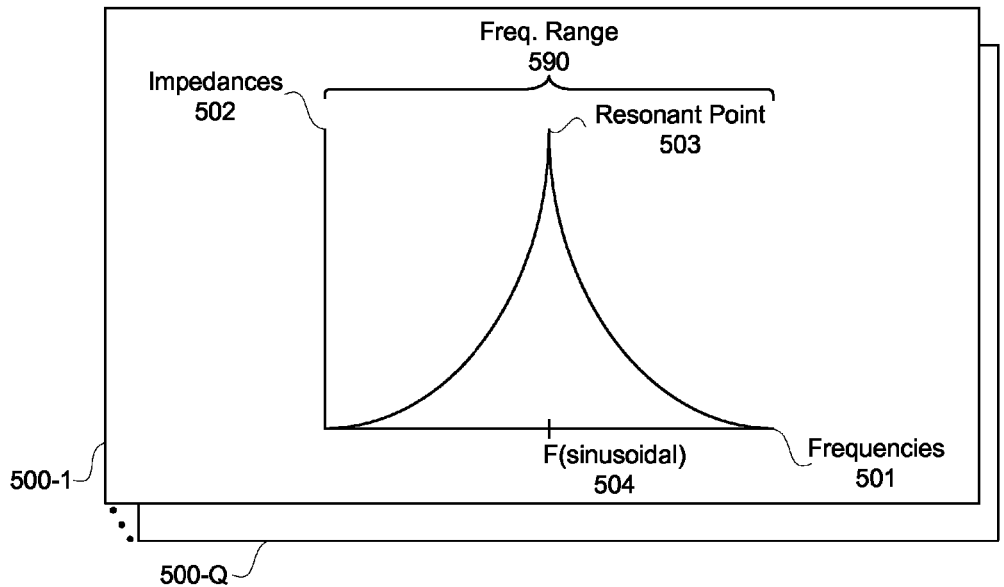
FIG. 8 is a graph diagram depicting an exemplary embodiment of z-profiles.
FIG. 9 is a table diagram depicting an exemplary embodiment of a noise factors table which may be stored in a database of FIG. 4.

With continuing reference to FIG. 4 and additional reference to FIG. 8, it should be understood that z-profiles may be generated for each I/O bank for each device package substrate for all die of a type. Thus, at 412, z-profiles 500-1 through 500-Q, for Q a positive integer greater than one, may be generated for each I/O bank of every die and associated device package substrate, such as for example all device package substrates associated with a family of FPGAs, and such z-profiles may be stored in database 410.

In an alternative embodiment, a curve may be selected as reference z-profile 500. Such curve may be arbitrarily selected, or may be generally in the middle of a distribution of all such z-profiles 500-1 through 500-Q. Alternatively, a reference z-profile 500 selected as a reference may be for a reference die and device package substrate combination for which measurements were obtained to generate excursion profile 550. Normalization to a reference z-profile and scaling therefrom may thus be used. However, it should be understood that while an embodiment with normalization and scaling may be implemented to reduce storage, the following description is for an embodiment that does not employ normalizing to a reference z-profile for purposes of clarity. However, it should be understood that normalization may be used to reduce data storage usage.

FIG. 9 is a table diagram depicting an exemplary embodiment of I/O standard noise factors table 900 which may be stored in database 410 of FIG. 4. Rows 902 of I/O standard noise factors table 900 list I/O standards 910-1 through 910-R, for R a positive integer greater than one. In this embodiment, no I/O standard is selected as a reference I/O standard. In an alternative embodiment, one of such I/O standards may be selected as a reference I/O standard. Columns 901 are associated with aggressor quantities 1 through A, where A is the maximum number of aggressors.

For each of I/O standards 910-1 through 910-R, noise factors $k_{R,A}$ for R rows and A columns may populate noise factors array 903. Noise factors are voltage excursion obtained at 413 divided by an associated z-profile impedance obtained at 412. In this exemplary embodiment, there are W, for W a positive integer greater than zero, I/O standard noise factors tables (e.g., tables 900-1 through 900-W), where W indicates the number of different device package substrate types used in measuring reference banks.

Accordingly, it should be understood that z-profiles 500-1 through 500-Q of FIG. 8 are generated by simulation for each bank of each die. It should further be understood that tables 900-1 through 900-W of FIG. 9 are generated by measurement of a reference bank of a reference die for each device substrate package type, and by using z-profiles for the reference banks for each device package substrate type from z-profiles 500-1 through 500-Q of FIG. 8 for obtaining impedances for division as described herein.

With renewed reference to FIG. 4, for a prediction of SSO noise, a selected I/O standard, bank identifier, frequency, and a selected number of aggressors are input at 401. At 402 a z-profile and an I/O standard noise factor are obtained from database 410 responsive to input at 401.

More particularly, z-profiles 500-1 through 500-Q are dependent upon bank and device package substrate, and thus a z-profile is selected for such bank and device package substrate responsive to the bank identifier input. Recall that I/O standard noise factors are dependent upon I/O standard, number of aggressors, and device package substrate type, and thus are selected from database 410 responsive to bank identifier (e.g., to find a table 900-W) and then to I/O standard and number of aggressors to find a noise factor in an identified table. More particularly, I/O standard noise factors are dependent upon the number of aggressors. Thus, for a number of aggressors and an I/O standard input at 401, an I/O standard noise factor may be selected from a table of tables 900-1 through 900-W in database 410.

At 404, the I/O standard noise factor is multiplied by at least a portion of the z-profile, both of which are obtained at 402. More particularly, an I/O standard noise factor is multiplied against the impedance on such z-profile at the frequency input at 401, and thus a point on the z-profile associated with the frequency input, such as a frequency of intended operation, may be used to identify an impedance.

For purposes of clarity by way of example and not limitation, suppose that the device identified by bank identifier input at 401, namely a selected device, is not a reference die. Thus for a selected number of aggressors 781 input at 401, intersection 782 on base noise curve 750-R would indicate a base noise value 783 for an input number of aggressors and an input I/O standard for an associated reference bank of a reference die in the same die package type as the selected device. Since z-profiles are for all device package substrates of interest or available, now or in the future, for all banks of all die, a z-profile for the selected device may be obtained, namely a z-profile for the same die, same device package substrate, and same bank as the selected device. Using the frequency input, an impedance z may be obtained at such frequency from such z-profile obtained for the selected device.

By multiplying a z-profile value obtained for such selected device with the I/O standard noise factor for the reference bank with the same device package substrate type as the selected device, the difference between the reference bank and the selected bank, if not a reference bank, may be adjusted for. Thus, rather than having a set of base noise curves for each die stored in a database 410, z-profiles may be used for banks other than the reference bank of the reference device for adjusting values as described herein.

At 406, output from prediction engine 450 is the result of the multiplication at 404, namely the predicted SSO noise for input 401. Such predicted SSO noise is noise at a selected frequency of operation of the bank identified at 401. It should be understood that base noise curves of FIG. 7 are generated at resonant frequencies for reference banks. These are assumed to be worse case noise conditions. Thus, the predicted SSO noise at the frequency of operation is based on this assumption.

Figure 10:
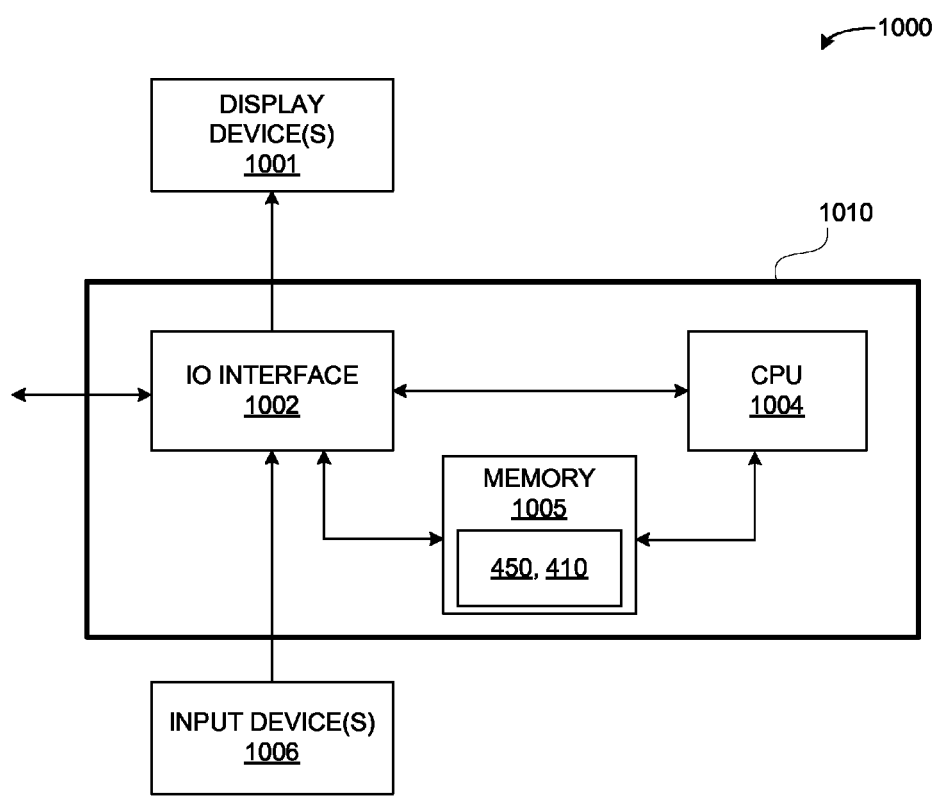
FIG. 10 is a block diagram of an exemplary embodiment of a computer system.

FIG. 10 is a block diagram of an exemplary embodiment of a computer system 1000. Computer system 1000 may include a programmed computer 1010 coupled to one or more display devices 1001, such as Cathode Ray Tube ("CRT") displays, Plasma displays, Liquid Crystal Displays ("LCD"), and to one or more input devices 1006, such as a keyboard and a cursor pointing device. Other known configurations of a computer system may be used.

Programmed computer 1010 may be programmed with a known operating system, which may be Mac OS, Java Virtual Machine, Linux, Solaris, Unix, or a Windows operating system, among other known platforms. Programmed computer 1001 includes a general-purpose processor, such as a central processing unit (CPU) 1004, memory 1005, and an input/output ("I/O") interface 1002. CPU 1004 may be a type of microprocessor known in the art, such as available from IBM, Intel, and Advanced Micro Devices for example. Support circuits (not shown) may include conventional cache, power supplies, clock circuits, data registers, and the like. Memory 1005 may be directly coupled to CPU 1004 or coupled through I/O interface 1002. At least a portion of an operating system may be disposed in memory 1005. Memory 1005 may include one or more of the following: random access memory, read only memory, magneto-resistive read/write memory, optical read/write memory, cache memory, magnetic read/write memory, and the like, as well as signal-bearing media as described below.

I/O interface 1002 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, I/O interface 1002 may be coupled to a conventional keyboard, network, mouse, display printer, and interface circuitry adapted to receive and transmit data, such as data files and the like. Programmed computer 1010 may be coupled to a number of client computers, server computers, or any combination thereof via a conventional network infrastructure, such as a company's Intranet and/or the Internet, for example, allowing distributed use for interface generation.

Memory 1005 may store all or portions of one or more programs, such as SSO noise prediction engine 450, or data, such as database 410, to implement SSO noise prediction flow 400 of FIG. 4. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of the program product for prediction engine 450, as well as data and documents thereof, may define functions of embodiments in and can be contained on a variety of signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network. The latter embodiment specifically includes information downloaded from the Internet and other networks.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for predicting simultaneous switching output noise of an integrated circuit device, comprising:
    obtaining, by a computer, user input including:
        an identification of an input/output bank of an integrated circuit die;
        an identification of a device package substrate to which the integrated circuit die is to be attached; and
        an identification of input/output interface to be used by the input/output bank;
    selecting a noise factor and an impedance responsive to the user input;
    multiplying the noise factor with the impedance to provide a result; and
    outputting the result as a prediction of the simultaneous switching output noise of the integrated circuit device.

2. The method according to claim 1, wherein the user input further includes a frequency of operation.

3. The method according to claim 2, wherein the input/output interface is selected from input/output standard interfaces.

4. The method according to claim 3, wherein the user input further includes a number of aggressors.

5. A method for predicting simultaneous switching output noise of an integrated circuit device, comprising:
    computing a plurality of impedance profiles as a function of frequency responsive to simulated stimulus provided to a system model,
    wherein the plurality impedance profiles are for a plurality of input/output banks of a plurality of integrated circuit devices that include the integrated circuit device;
    generating through measurement at least one excursion profile for at least one reference input/output bank of at least one reference die for at least one device package substrates type;
    identifying a resonant frequency from the at least one excursion profile;
    generating at least one base noise curve at the resonant frequency for at least one input/output interface using multiple quantities of aggressors;
    dividing the at least one base noise curve with impedance from an impedance profile of the plurality of impedance profiles for the at least one input/output reference bank for the at least one device package substrate type to provide noise factors;
    storing the noise factors according to the at least one input/output interface and the numbers of aggressors in a database;
    storing the plurality of impedance profiles in the database; and
    outputting a value for the predicted simultaneous switching output noise of the integrated circuit device by a prediction engine.

6. The method according to claim 5, wherein the prediction engine is configured to:
   access the database to obtain a noise factor from the noise factors and an impedance from an impedance profile of the plurality of impedance profiles responsive to user input; and
   multiply the noise factor by the impedance using a general-purpose processor to provide the value; and
   wherein the computing the plurality of impedance profiles include:
   obtaining a structural representation for a device package substrate of the at least one device package substrate type;
   determining a substrate model from the structural representation;
   integrating the substrate model into the system model in a simulation environment; and
   providing as the stimulus a sinusoidal signal to at least one port of the system model to obtain the impedance profile through simulation.

7. The method according to claim 6, further comprising:
   obtaining at least one manufacturing database file for the device package substrate; and
   determining the structures using manufacturing information in the manufacturing database file,
   wherein the manufacturing information includes three-dimensional representations of the structures and materials to be used for the structures.

8. The method according to claim 5, wherein:
   the substrate model is a scattering parameter model configured to provide a behavior responsive to frequency of at least one circuitry network associated with the at least one input/output reference bank; and
   the integrated circuit device includes the device package substrate and an integrated circuit die.

9. The method according to claim 8, wherein the at least one circuitry network includes a power system associated with the at least one input/output reference bank.

10. The method according to claim 8, wherein:
    the scattering parameter model is a three port scattering parameter model in a format including lists of frequencies, magnitudes, and phases.

11. A non-transitory machine-readable medium having stored thereon information that, when executed by a general-purpose processor, cause performance of a method for predicting simultaneous switching output noise of an integrated circuit device, the method comprising:
    obtaining user input including:
       an identification of an input/output bank of an integrated circuit die;
       an identification of a device package substrate to which the integrated circuit die is to be coupled;
       an identification of input/output interface to be used by a plurality of input/output banks; and
       a quantity of aggressors;
    selecting a noise factor and an impedance responsive to the user input;
    multiplying the noise factor with the impedance to provide a result; and
    outputting the result as a prediction of the simultaneous switching output noise of the integrated circuit device.

12. The medium according to claim 11, wherein the user input further includes a frequency of operation.

13. The medium according to claim 12, wherein the input/output interface is selected from input/output standard interfaces.

14. The medium according to claim 13, wherein the user input further includes a number of aggressors.

15. The medium according to claim 14, wherein the method further comprises:
    computing a plurality of impedance profiles as a function of frequency responsive to simulated stimulus provided to a system model;
    wherein the plurality of impedance profiles are for the plurality of input/output banks of a plurality of integrated circuit devices that includes the integrated circuit device;
    generating at least one excursion profile for at least one reference bank of at least one reference die for at least one device package substrates type;
    identifying a resonant frequency from the at least one excursion profile;
    generating at least one base noise curve at the resonant frequency for at least one input/output protocol using numbers of aggressors;
    dividing the at least one base noise curve using impedance information in the plurality of impedance profiles for the at least one reference bank for the at least one device package substrate type to provide noise factors including the noise factor;
    storing the noise factors according to the at least one input/output protocol and the numbers of aggressors in a database;
    storing the plurality of impedance profiles in the database; and
    outputting the result for the predicted simultaneous switching output noise of the integrated circuit device from a prediction engine;
    wherein the prediction engine is configured to:
       access the database to obtain the noise factor from the noise factors and the impedance from a particular impedance profile of the plurality of impedance profiles responsive to user input; and
       multiply the noise factor by the impedance using the general-purpose processor.

16. The medium according to claim 15, wherein the computing the plurality of impedance profiles include:
    obtaining a structural representation for a carrier substrate associated with the at least one device package substrate type;
    determining a substrate model from the structural representation;
    simulating the substrate model in the system model;
    integrating the substrate model into the system model in a simulation environment; and
    providing as the stimulus a sinusoidal signal to at least one port of the system model to obtain the particular impedance profile through simulation.

17. The medium according to claim 16, wherein the method further comprises:
    obtaining at least one manufacturing database file for the carrier substrate;
    determining the structures using manufacturing information in the manufacturing database file; and
    the manufacturing information including three-dimensional representations of the structures and materials to be used for the structures.

18. The medium according to claim 15, wherein:
    the substrate model is a scattering parameter model configured to provide a behavior responsive to frequency of at least one circuitry network associated with the at least one input/output reference bank.

19. The medium according to claim 18, wherein the at least one circuitry network includes a power system associated with the at least one reference bank.

20. The medium according to claim 15, wherein:
the database has stored therein the plurality of impedance profiles generated by simulation for all of the plurality of input/output banks of all carrier substrates of all die of a family of FPGAs; and
the database further has stored therein noise factors for all input/output protocols for multiple quantities of aggressors for all reference banks of all device package substrate types associated with the family of FPGAs.

\* \* \* \* \*